United States Patent [19]

Vanderstraeten

[11] Patent Number: 5,033,579
[45] Date of Patent: Jul. 23, 1991

[54] SOUND-AND/OR VIBRATION-DAMPING COATING, ELEMENT PROVIDED WITH SAID COATING AND PROCESS FOR APPLYING THE LATTER

[75] Inventor: Johan Vanderstraeten, Drongen-Gent, Belgium

[73] Assignee: Emiel Vanderstraeten, Gent, Belgium

[21] Appl. No.: 318,156

[22] Filed: Mar. 2, 1989

[30] Foreign Application Priority Data

Mar. 10, 1988 [BE] Belgium .............................. 08800265
Apr. 8, 1988 [BE] Belgium .............................. 08800397

[51] Int. Cl.$^5$ .............................................. F16F 15/00
[52] U.S. Cl. ..................................... 181/208; 181/209; 181/294; 83/835
[58] Field of Search ................................ 181/207–209, 181/294; 83/835; 428/312.6, 312.8, 313.7, 313.9

[56] References Cited

U.S. PATENT DOCUMENTS

| 2,216,728 | 10/1940 | Brenner et al. | 51/298 |
| 3,496,973 | 2/1970 | Ballard | 83/835 |
| 3,895,143 | 7/1975 | Tarlow | 181/294 X |
| 3,982,359 | 9/1976 | Elbel et al. | 446/377 |
| 4,010,818 | 3/1977 | Westley | 181/294 |

FOREIGN PATENT DOCUMENTS

| 3047888 | 7/1982 | Fed. Rep. of Germany . |
| 3416186 | 1/1985 | Fed. Rep. of Germany . |
| 2380845 | 9/1978 | France . |
| 591839 | 8/1947 | United Kingdom . |
| 856047 | 12/1960 | United Kingdom . |
| 930596 | 7/1963 | United Kingdom . |

OTHER PUBLICATIONS

Patent Abstract of Japan, vol. 8, No. 9 (M-268) (1446), Jan. 14, 1984.
JP-A-58 171 262, 4/1982.

Primary Examiner—Benjamin R. Fuller
Assistant Examiner—Victor DeVito
Attorney, Agent, or Firm—Cushman, Darby & Cushman

[57] ABSTRACT

A sound- and/or vibration-damping coating, which comprises a layer of a relatively hard substance (2) having pores, interstices, cavities (3) and/or hollows (12) containing a material (4) which has a higher plasticity or elasticity than said substance (2), and an element provided with said coating. This coating may be applied on said element by applying to the surface of the latter a surface treatment ensuring the adhesion of the layer of relatively hard substance (2), by applying this layer to the so treated surface by projection of said substance in the at least molten state and as droplets, by using known per se techniques, and by entering said material (4) into cavities (3) formed between coagulated droplets of said substance (2).

19 Claims, 1 Drawing Sheet

SOUND-AND/OR VIBRATION-DAMPING COATING, ELEMENT PROVIDED WITH SAID COATING AND PROCESS FOR APPLYING THE LATTER

BACKGROUND OF THE INVENTION

1. Field of the Invention

The present invention relates to a sound-and/or vibration-damping coating, more particularly intended to be applied to an element which can be subjected to vibrations, such as a circular or not saw blade, grinding machine disc, grinding wheel, loudspeaker, as well as metal wall, box-girder and frame.

2. Description of the Prior Art

The generally known sound - and/or vibration-damping coatings have the drawback that either they are not very efficient, or they can only be applied to plane surfaces which moreover can not substantially be subjected to any strain.

This is for example the case with coatings formed of a metal sheet which is fixed through a visco-elastic material layer on a wall intended for sound-damping.

SUMMARY OF THE INVENTION

One of the essential objects of the present invention is to provide a coating of the above-mentioned type, which can be used in extremely different fields, with however a preference for metal elements wherein vibrations very easily and thus, the coating at the origin can dampen very cumbersome noises.

To this end, according to the invention, the coating comprises a layer of a relatively hard substance having interstices or cavities containing a material of a higher plasticity or elasticity than the substance.

Advantageously, said layer has an open-cell or -pore structure.

The invention also relates to an element, in particular a metal element, provided with such a sound- and/or vibration-damping coating.

Finally, the invention concerns a process for applying the coating to such an element.

This process is characterized in that the surface(s) to be coated of the element are subjected to a surface treatment in order to ensure adhesion of the layer of the relatively hard substance, then this layer is applied to the so treated surface by projecting this substance in the at least partly molten state and as droplets, for example by using known per se metal-coating techniques, such as arc spray, flame spray, plasma spray, vacuum plasma spray, and the above-mentioned plastic or elastic material is entered into the interstices or cavities existing between the coagulated droplets of this substance, as a relatively fluid form, where this substance can then solidify.

Other details and features of the invention will become apparent from the description given hereinafter by way of non-limitative examples of some particular embodiments of the coating and of the process for applying the latter to elements to be treated.

BRIEF DESCRIPTION OF THE DRAWING

On these Figures, same reference numerals relate to identical parts.

DETAILED DESCRIPTION OF THE PREFERRED EMBODIMENT

Although the coating according to the invention can be applied to any type of element wherein acoustic or not vibrations are subjected to be produced, such as for example elements which are submitted to a rotation, translation or combined movement at relatively high speeds, the hereinafter given description will be limited, for illustrating the invention, to a sound-damping coating provided on the faces of a circular saw which is for example provided for cutting concrete or natural stone. This is in fact a particularly interesting application.

According to the invention, this coating is in general characterized in that it comprises a layer of a relatively hard substance 2 having interstices or cavities 3 containing a material 4 of a higher plasticity or elasticity than the substance 2. In fact, the material 4 must be substantially less hard than the substance 2, while presenting a sufficient consistency to be able to absorb the energy of vibrations generated in the layer of the substance 2. Thus, in principle, any solid materials which can, on one hand, be entered into the cavities 3 provided in the layer of substance 2 and, on the other hand, be deformed under the action of the substance 2 are suitable. Thus, this could be not only plastic materials but also for example relatively soft metals, preferably having a relatively low melting point.

Figure 1:
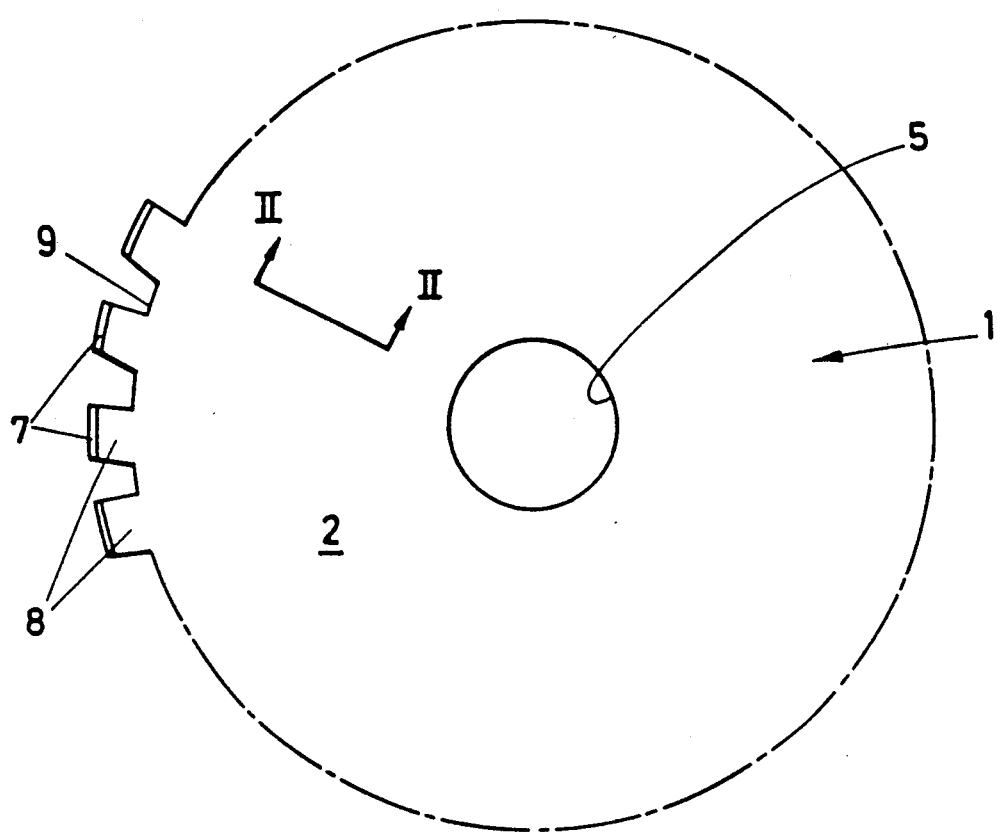
FIG. 1 is an elevation view of an element portion, more particularly of a circular saw, provided with a coating according to the invention.

FIG. 1 shows a circular saw the two large surfaces 1 of which are wholly covered with such a coating.

In this embodiment, the layer of substance 2 has an open-cell or -pore structure 3 the porosity of which is preferably comprised between 8 and 30%.

In fact, there exists a relation between the viscosity condition of the material 4 at the time when the latter is applied to the layer of substance 2, and the sizes of the pores 3 since it is necessary that this material can easily enter into said pores. So, if the pores are relatively large, use may be made of a relatively viscous material. This may be, for example, a thermoplastic or thermosetting material. In the case of a thermoplastic material, the latter can be entered in the molten state into the pores 3 where it solidifies by cooling. In the case of a thermosetting material, use may be made for example of a reaction mixture in the liquid state, which polymerizes inside the pores.

Figure 2:
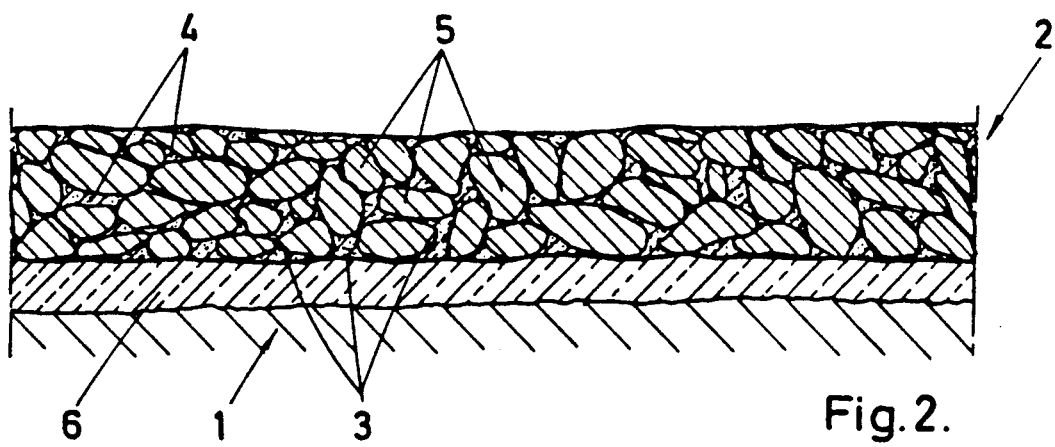
FIG. 2 is a schematic showing of a partial cross-section along line II—II of FIG. 1.

In the specific embodiment which is more particularly shown by FIG. 2, the layer of the relatively hard substance 2 is essentially made of particles 5 directly bonded together, so that cavities 3 are formed between the particles 5 and moreover so that the particles can deform or move to some extent with respect to each other under the effect of the vibrations generated in the coating. Accordingly, the shape and volume of cavities 3 provided between said particles vary as a function of said vibrations about a determined shape and volume they present when the saw blade is at rest.

Due to this relative movement of the particles, the material 4 having a higher plasticity or elasticity than the substance 2 is subjected in turn to a compression and to an expansion, so that the vibration energy which is thus generated in the substance 2 is transformed into thermal energy inside material 4.

The vibrations which are generated in the saw blade generally issue from the contact of the latter at a relatively high speed, with an article to be sawed, such as a concrete or natural stone block.

It has been found that very good results were obtained when the layer of substance 2 was essentially formed of grains or particles having a mean diameter between 50 and 150 microns.

Advantageously, the layer of substance 2 is essentially made of coagulated metal droplets 5 which are directly bonded together and which are formed by liquid metal projection onto the surface to be covered.

The size of the pores, interstices or cavities 3 is generally of about 30 micrometers and varies in most cases between 10 and 60 micrometers. Preference is generally given to a layer 2 wherein the pores, interstices or cavities 3 are as numerous as possible and distributed as homogeneously as possible.

In some cases, the layer of substance 2 can be made of or comprise metal and/or ceramic fibers, for example of a length of 20 to 100 micrometers and of a diameter of 10 to 40 micrometers. These fibers are statistically mixed together so as to so obtain, the porosity in an as homogeneous as possible manner.

The layer of substance 2 may thus be possibly made of a mixture of grains and fibers.

According to a particularly advantageous embodiment of the invention, the layer of substance 2 is essentially made of a wear-resisting metal or alloy, such as a chrome-nickel steel.

According to the nature of the material 4, it could be possible, according to still another embodiment of the invention, to protect the layer of substance 2 by a product having a very good wear-resistance, such as tungsten carbide.

Very satisfactory results were obtained when the material 4 was formed of a known per se phenol resin.

It is obvious that use could be made of other plastic materials presenting elastic or plastic properties, and more particularly visco-elastic or visco-plastic properties, such as some epoxy resins and polymers of the elastomer type.

The layer of substance 2 may be also fixed to the surface to be covered 1 of the saw blade through a fixing layer 6 which preferably contains nickel-aluminium, nickel-chrome, molybdenum or equivalent metals having good adhesive properties.

The thickness of the layer of substance 2 may vary according to the type of element but is in general comprised between 0.1 and 0.4 mm, preferably between 0.2 and 0.3 mm. This thickness is a function of the mass and more particularly of the thickness of the element and, when a saw blade is involved, also of the thickness of the cutting edge 7 of the teeth 8 existing at the periphery of the saw blade. Obviously, it goes without saying that the damping properties are directly proportional to the coating thickness but that generally for economical reasons it is aimed at obtaining a coating of as reduced a thickness as possible. Moreover, in some applications, this thickness can vary from a location to another, either continuously or in a discontinuous manner.

Figure 3:
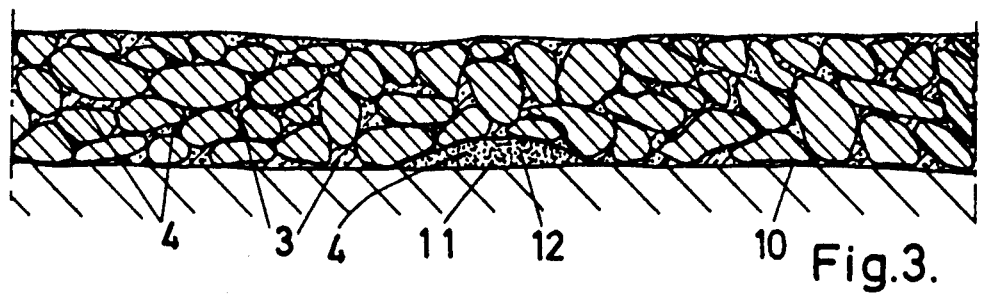
FIG. 3 is a cross-section similar to FIG. 2, showing a particular variant of the coating according to the invention.

Still in other cases, as shown in cross-section by FIG. 3, the layer of substance 2 is fixed to the surface to be covered at the location of determined areas 10 and is at least partly free or possibly loosened with respect to other areas 11 of this surface. Areas 10 where this fixing occurs are generally constituted by 75 to 95% of the whole surface of the layer 2.

In areas 11 where the layer of substance 2 does not adhere to the surface to be covered, hollows 12 are formed, which are then filled up in the same way as cavities 3 with material 4.

These areas 11 may for example be formed by using a product preventing the fixation of the layer 2, such as a thin layer of "Teflon", polyvinyl alcohol, epoxy resin, combined with use of a screen.

For application of the coating to a surface to be covered, such as side faces of a circular saw blade, one may proceed as follows according to the invention.

In a first operation, application is made to the surface to be covered, of a known per se treatment, generally called "surface treatment" which has for its object to render rougher this surface or at least areas of the latter to which the layer of substance 2 has to be fixed, so as to allow to generate a good durable adhesion of this layer of substance 2.

This roughness can for example be obtained by blasting with sand for example formed of slags, aluminium oxide and the like, the granulometry of which is preferably between 0.5 and 2.5 mm.

Another possibility consists in applying to this surface a chemical treatment, for example with an acid.

In a second operation, the fixing layer 6 such as already described hereinabove can be applied if desired.

In a third operation, which is the most important operation, the layer of substance 2 which is generally made of wear-resisting metals is formed. This is preferably made by liquid metal projection at a well determined speed onto the surface to be covered.

In this regard, use may be made of known per se metal-coating techniques, namely arc spray, flame spray, plasma spray, vacuum plasma spray, either from a metal wire or from a metal powder or from fibers and the like.

According to the invention, it can be very important to cautiously control the temperature of the metal droplets which are thus projected onto the face of the saw blade. By a severe selection of this temperature, one can take care that the droplets are viscous enough so as to be able to form on the face 1, distinct particles preferably of very irregular shapes in the layer of substance 2 so as to so obtain a maximum porosity of this layer with a substantially homogeneous distribution of the porosity throughout the latter.

Another parameter is the distance between the gun head, not shown on the Figures, and the surface to be covered, and the orientation or position of this head with respect to this surface.

This distance must be such that, when the droplets of molten metal reach this surface, the droplets are already partly coagulated and that their kinetic energy is reduced enough so that they undergo a minimum deformation when contacting the surface, while ensuring a sufficient adhesion to the latter and to each other.

In a fourth operation, the material 4, which is preferably a visco-elastic or visco-plastic material, is entered into the cavities 3 of the layer of relatively hard substance 2.

This can be made by impregnation, more particularly by vacuum impregnation.

Use of this latter technique can more particularly be important if the cavities have relatively small pores or if the material 2 has a relatively high viscosity.

Another technique consists for example of projecting the visco-elastic material in a liquid enough state onto the layer of material 2 in order that it can enter thereinto.

Finally, this layer could also be subjected to a polishing, thus after the material 4 has been entered into the pores of this layer.

According to another embodiment of the process according to the invention, the layer of substance 2 can be applied as an alloy made of this relatively hard material and of another substance which can be easily chemically eliminated afterwards.

Thus, by eliminating this other substance from the droplets coagulated on the surface to be covered with this alloy, it is so possible to obtain a final layer presenting relatively important pores or cavities which then can be filled up with material 4.

Such an alloy may, for example, be formed of iron and copper, copper being then able to be eliminated by dissolving it in an acid before entering the visco-elastic or visco-plastic material.

Hereinafter some specific examples are given, which allow the object of the invention to be more completely illustrated.

EXAMPLE 1

To form the layer of said hard substance, use was made of an alloy having the following composition: Ni: 67%; Cr: 17%; Bo: 3%; Si: 3%; C: 0.5%; Mo: 4%; Cu: 3%; Fe: 2.5%. A layer of this alloy having a melting point of about 1100° C. was applied to a steel plate according to the so-called "flame spray" technique of which comprises introducing this alloy into the flame of a gun supplied with a mixture of acetylene and oxygen, in well determined proportions, so allowing this alloy to be brought to the molten condition and to be sprayed by the flame of a gun onto the steel plate. In this Example, this alloy is as a powder with a mean granulometry of about 150 micrometers. The latter may in general vary between 100 and 200 micrometers. The gun used was a METCO gun, type 5P. The distance of projection was about 60 cm. The position of the flowmeter of the gun was controlled on 34 for the acetylene gas and the oxygen gas. The hard and porous layer so formed on the steel plate had a thickness of about 0.2 mm, the porosity being of about 23%. After cooling of this layer to a temperature of about 110° to 120° C., this layer was impregnated with a visco-elastic material formed of an epoxy resin known under the commercial designation "Araldit", type CY 221, which is a product of Ciba-Geigy and which reaches its minimum viscosity at a temperature of about 110°-120° C.

EXAMPLE 2

In this Example, the technique used for applying the layer of the said relatively hard substance onto a support, such as a steel plate, was the so-called arc spray technique.

This technique consists of forming an electrical arc between the ends of two metal wires, the support of which must be covered, and of projecting the so molten metal through a compressed air current onto this support. The metal such as used was a steel containing 2.2% of Mn, 1.9% of Cr and 1.2% of C, this steel being as a wire of a diameter of 2 mm. The electric current was of about 400A. The gun was of the type 2 RG METCO. The air pressure at the mouth was of 2 kg/cm². The projection distance was of about 80 cm. A hard layer was obtained, having a porosity of about 18% and a thickness of about 0.4 mm. This layer was then vacuum impregnated with a phenol resin of the company "Alterpaint".

EXAMPLE 3

In this Example, the technique used to apply the layer of said relatively hard substance onto a support, such as a support plate, was the so-called plasma spraying technique. According to this technique, a plasma arc was formed in a gas containing 90% of argon and 10% of hydrogen. The hard substance used was a ceramic (87% of $Al_2O_3$ + 13% of $TiO_2$) and was entered into this plasma as a powder of a granulometry of about 56 to 80 micrometers. The electric current was of about 500A and the voltage of 60 Volts.

A hard layer was obtained, having a thickness of about 0.3 mm with a porosity of about 15%. This layer was then impregnated with a polyurethane elastomer, known under the commercial designation "Monotaan A80". This elastomer had been previously brought to a temperature of about 70° C. in order to improve its penetration into the hard layer.

The invention is not limited to the embodiments such as hereinabove described of the invention and that, within the scope of the latter, several variants may be envisaged, in particular concerning the process used to form the hard layer with cavities and/or hollows, and the process used to apply the visco-elastic or visco-plastic material into said cavities and/or hollows. Moreover, the nature of the latter material may be very diversified. This is also true concerning the substance of which the relatively hard layer is formed.

It is more particularly important that the layer of substance 2 forms a rigid enough skeleton which presents a sufficient mechanical resistance but which at the same time retains some flexibility under the action of vibrations generated in the coating. From this, it results that the different particles must in a way be bonded together and cannot for example be found in a free state in the visco-elastic or visco-plastic material, at least regarding most of the particles.

Besides, in some particular cases, the visco-elastic or visco-plastic material could be applied simultaneously with the relatively hard substance to the surface to be covered.

Still in other cases, at least a portion of the layer of hard substance could also be formed by electrolysis or by a known evaporation technique. This could be for example useful if some areas should be provided on the surface to be covered, where the layer of hard substance 2 is not fixed to this surface, as shown by FIG. 3. In this case, a first thin deposit of this substance could be made by electrolysis or evaporation, followed by a second deposit, for example by one of the hereinabove described techniques, the yield of which is substantially higher than that by electrolysis or evaporation.

Thus, in a practical manner, a layer of the plastic or elastic material 4 is applied for example to areas 11 of the surface to be covered by the coating according to the invention. Then, by condensation of an evaporated metal, a thin film of an electricity conducting metal is formed on this surface, thus as well on the layer of material 4 provided on areas 11 as on the remaining portion of this surface, namely areas 10. This operation may then be followed by an electrolysis which allows a layer of hard substance 2 to be deposited on said conducting metal; this layer must not necessarily include itself some cavities, but given the presence of hollows 12 previously formed at the location of areas 11.

The coating according to the invention more particularly differs from the known coatings formed of a hard substance and of an elastic or plastic material, such as provided for example on the teeth of a cutting device, by the fact that the hard substance forms a porous layer of several superposed levels of particles, presenting itself as a skeleton, in which the elastic or plastic material is included, and/or delimits on the surface to be covered, some hollows containing the elastic or plastic material, while, in these known processes, the hard substance is generally formed of hard and cutting particles, which are rigidly fixed together, only the interstices of which in the external surface are filled up with an antifriction material, or still of a very dense metal layer the porosity of which does not generally exceed 1 to 2% and which is rigidly fixed on the whole surface to be covered.

It has been found that these known coatings do not allow to damp acoustic or not vibrations.

In order to obtain a layer of the hard substance 2, which is porous enough according to the invention, it could be useful to form on the surface to be covered, some particles having an as irregular as possible shape. Besides, it is of interest to use a metal powder wherein the internal variations of granulometry are as reduced as possible. Moreover, the way according to which the metal is projected onto the surface to be covered, such as the projection distance and the slope angle of the gun, can have a high influence on the structure of the layer of hard substance 2.

Finally, the metals to be projected must preferably have a minimum hardness so as to allow a sufficient porosity of the hard substance layer to be obtained, so that relatively soft and plastic metals, such as aluminium and copper, could require particular cautions or the application of the technique hereinabove described in relation with FIG. 3 in order to form some hollows between the layer 2 and the surface to be covered.

If use is made of particles of a relatively hard product having a high melting point, such as tungsten carbide or a ceramic material in association or not with another metal, such as for example cobalt, said particles could be subjected to a superficial fusion before being applied to the surface to be covered, so that said particles are able to adhere to each other and to said surface without being substantially deformed.

Thus, granules composed of a hard core, such as steel, having for example a melting point of about 1600° C., this core being surrounded with a sheath of a material having a lower melting point, such as a metal of a melting point for example of about 1000° C. could be quite well suitable in order to carry out the coating according to the invention. As a matter of fact, it is sufficient to bring said granules to the melting temperature of the material of which the sheath is formed when said granules are applied to the surface to be covered. The deformation of the granules would be in this case limited to a minimum, so as to so generate a maximum porosity between said granules. Other granules which could be used are those having a plastic or elastic material core surrounded with a relatively hard substance, such as for example granules having a silicone core surrounded with a metal powder, such as of nickel, or granules having a polyester core surrounded with a metal film. This external sheath could thus melt so as to allow these granules to be united together, even without pores existing between said granules, since in such a case the pores are inside the granules themselves.

Still another technique which could be suitable according to the invention is the powder metallurgy consisting of hot pressing and sintering metal powders on the surface to be covered, while seeing to obtain a sufficient porosity of the so formed layer.

Independent of the applied process, it has been generally found that good results of vibration damping are obtained when the layer of said hard substance comprises several levels of particles, so that the pores formed between the latter extend substantially in an uniform manner along three directions.

Still another way of entering the plastic or elastic material into the pores of the hard substance layer consists of using solutions, suspensions or emulsions of this material; according to this way, this layer is impregnated with said liquids and then the excess of liquid is evaporated out so as to obtain the material in the solid or semi-solid state inside the pores.

Finally, the coating according to the invention, in particular owing to the easiness of its application and its efficiency, even in a relatively reduced thickness, can in principle be applied to any surfaces, even complex surfaces, of elements where vibration problems are raised, such as cutting tools, abrasion tools and the like, metal frames of machines or vehicles, metal walls, such as automobile bodies, cylinder fins of a bike motor, metal part of loudspeakers and the like.

The porosity of the relatively hard substance, which generally has to be considered as an important feature of the invention, can for instance be determined by the technic known as "hydrostatic weighing".

I claim:

1. A sound- and/or vibration-damping coating comprising:
    a layer having wear resistance and including metallic particles formed of one of a metal, an alloy, carbides or metallic oxides, and a material having a higher plasticity than said particles,
    said particles being formed of solidified droplets which are directly bonded together so as to form in said layer an open-pore structure having pores and a porosity in a range of from 8% to 30% in said layer,
    said droplets having a mean diameter in a range of from 50 to 150 microns, and
    said pores having sizes ranging from 10 to 60 microns and being distributed substantially homogeneously through said layer with said material being contained in said pores.

2. A coating as claimed in claim 1, wherein the layer has an open-cell.

3. A coating as claimed in claim 1, wherein said particles may deform and/or move to some extent with respect to each other under effect of the vibrations generated in the coating, by deforming the material included in the cavities.

4. A coating as claimed in claim 1, wherein said particles are essentially made of coagulated metal droplets, 5. A coating as claimed in claim 1, wherein said layer may be obtained by projection of a liquid metal by flame projection technique of metal powders.

6. A coating as claimed in claim 1, wherein said layer comprises fibres having a length of 20 to 100 micrometers and a thickness of 10 to 40 micrometers.

7. A coating as claimed in claim 1, wherein said layer comprises a wear-resisting metal or alloy.

8. A coating as claimed in claim 1, wherein said material is formed of a visco-elastic or visco-plastic material, said material being a phenol resin.

9. A coating as claimed in claim 1, wherein said layer has a thickness between 0.1 and 0.4 mm, 10. A coating as claimed in claim 1, wherein said coating is applied to a metal element 11. A coating as claimed in claim 10, wherein said layer is rigidly fixed to a surface to be covered of the element at a locations of determined areas and is at least partly free with respect to other areas of the surface.

12. A coating as claimed in claim 11, wherein the areas where the layer is rigidly fixed to the surface to be covered constitute between 75 and 95% of the areas of the surface.

13. A coating as claimed in claim 10, wherein said layer is fixed to the surface to be covered by use of a fixing layer which preferably contains a metallic material of nickel-aluminum, nickel-chrome or molybdenum.

14. A sound- and/or vibration-damping coating according to claim 1, wherein said structure is formed of several superposed levels of said particles so that said particles are presented as a skeleton in which the material is included.

15. A sound- and/or vibration-damping coating comprising:
a wear-resistant layer including metallic particles formed of a metal, an alloy, carbides or metal oxides, and a material having a higher plasticity than said particles,
said particles being directly bonded together so as to form in said layer an openpore structure having pores with sizes ranging between 10 and 60 microns and being distributed substantially homogeneously through said layer,
the material being contained within said pores.

16. A coating as claimed in any of claims 1, 14 or 15 wherein said coating is applied to a steel saw blade.

17. A coating as in claim 1 or 15 wherein said material has a higher elasticity than said particles.

18. A metal element having a sound- and/or vibration-damping coating applied thereto, said coating including:
a wear-resistant layer including metallic particles formed of one of a metal, an alloy, carbides or metal oxides, and a material having a higher plasticity than said particles,
said particles being directly bonded together so as to form in said layer an open-pore structure having pores with sizes between 10 and 60 microns and being distributed substantially homogeneously through the said layer,
the material being contained within said pores.

19. A metal element as claimed in claim 18, wherein said coating has a porosity between 8% and 30% and the droplets have a mean diameter between 50 and 150 microns.

* * * * *